Patented Sept. 29, 1925.

1,555,257

UNITED STATES PATENT OFFICE.

BENJAMIN TALBOT, OF NORTHALLERTON, ENGLAND.

LINING OF PIPES.

No Drawing. Application filed July 5, 1924. Serial No. 724,538.

*To all whom it may concern:*

Be it known that I, BENJAMIN TALBOT, a subject of the King of Great Britain, residing in Northallerton, England, have invented certain new and useful Improvements in the Lining of Pipes, of which the following is a specification.

The present invention relates to the lining of metal pipes by centrifugal action with tar, pitch, bitumen or other hydrocarbons which are solid at ordinary temperatures, to protect them from rust, and so increase their length of time in service.

The principle of lining pipes by means of centrifugal action and also the making of concrete or cement pipes on the same principle is well-known, and it has also been previously proposed to line concrete or cement pipes with bitumen.

In the lining of metal pipes in this manner with hydrocarbons as mentioned above it is not feasible for various reasons to have a lining of the desired thickness of the pure material used, whilst on the other hand, in many cases it is desirable that the surface at any rate of the lining should be of pure material.

To attain this result, instead of using the pure hydrocarbon or the like, solid at ordinary temperatures, I mix with it a large proportion of reinforcing material, such as granite chips, barytes or other suitable material, ground to a sufficiently fine state. This mixture is heated so that the pitch or other hydrocarbon is in a fluid state and applied to the interior of the pipe to be lined by means of centrifugal action, and for the purpose of keeping the hydrocarbon mixture liquid whilst the lining is being spun, I heat the interior of the pipe to a sufficient temperature when necessary.

I introduce the mixture preferably by mechanical means through a heated trough or otherwise, which spreads it over the length of the pipe, between the limits of the retaining rings usually provided at the two ends, and the centrifugal action results in the mixture being spread uniformly over the interior of the pipe and also has a further result that the ground granite or similar powdery reenforcing material owing to its greater specific gravity are forced to the outer surface of the lining, that is to say, the face of the lining next to the pipe, and are bound together by the hydrocarbons. By revolving the pipe at a sufficient speed, the particles of reenforcing material are forced by centrifugal action toward the wall of the pipe, leaving on the exposed face of the lining a comparatively pure hydrocarbon surface, substantially free from reenforcing material. In this manner a lining of the desired thickness and of smooth and practically pure hydrocarbon exposed surface is obtained at a considerably lower cost and of greater strength than if the entire lining were made of pure hydrocarbon by itself.

After the lining has been applied in this manner the whole is cooled to a suitable temperature whilst the pipe is still revolving, so that the inner exposed surface of hydrocarbon becomes sufficiently solid not to run when the centrifugal action ceases, and is of an even glossy surface, which is so desirable for the flow of water or other liquids. To effect this cooling of the lining it may be convenient to spray the outside of the steel pipe, when such is used, by means of water, preferably applied fairly equally by jets along its entire length, or the cooling may be effected by means of air drawn or forced through the interior of the pipe.

I have found that the hydrocarbon mixture can be varied within quite wide limits to suit the pipe to be lined. For the majority of steel pipes I have found a mixture of bitumen, pitch and anthracene oil to give good results when intimately mixed with the reinforcing material. A small percentage of rosin, lime, sulphur, resin, etc., may advantageously be added, the lime tending to neutralize and saponify any tar acids present the effect of the addition of sulphur is to render the lining tougher and more flexible, so that, for example, if the hydrocarbon is a bitumen of low melting point the addition of sulphur raises the melting point and at the same time gives a product of greater flexibility than is usual with bitumen of higher melting point.

A suitable proportion between hydrocarbon mixture and reinforcing material may be given as follows:—65 to 75 parts by weight of fine granite chippings, 35 to 25 parts by weight of hydrocarbon mixture. The granite chippings should preferably be of such fineness that they will pass a $\frac{1}{32}''$ sieve, but the degree of fineness may vary considerably, depending mainly on the thickness of the lining required, which in turn depends upon the depth of the retaining or determination rings usually provided at the ends of the tube.

I sometimes find it advantageous also to introduce the hydrocarbon mixture in more than one addition, the first or subsequent lot, mixed with the chippings, being of a softer quality than the last lot for the final face, which latter may be quite thin and composed largely of bitumen.

Having thus fully described the nature of the said invention and the best means I know for carrying the same into practical effect, I claim:—

1. A process of lining metal pipes, which consists in feeding a mixture of a hydrocarbon material and a powdery reinforcing material into the pipe to be lined and then rapidly rotating the pipe about its longitudinal axis at a temperature at which the hydrocarbon material is fluid and continuing the rotation with reduction of temperature until the lining is sufficiently set.

2. A process of lining metal pipes, which consists in feeding a mixture of a hydrocarbon material and a powdery reinforcing material into the pipe to be lined, rotating the pipe about its longitudinal axis at a temperature at which the hydrocarbon material is fluid and at a speed tending to segregate the reinforcing material by the action of centrifugal force until the exposed surface of the lining is comparatively pure hydrocarbon material and has a smooth and glossy surface.

3. A process of lining metal pipes, which consists in feeding a fluid mixture of a hydrocarbon material and a powdery reinforcing material into the pipe to be lined and rapidly rotating the pipe about its longitudinal axis and continuing the rotation with reduction of temperature until the lining is sufficiently set.

4. A process of lining metal pipes, which consists in heating a mixture of a hydrocarbon material and a powdery reinforcing material to a temperature at which the hydrocarbon material is fluid, feeding the heated mixture into the pipe to be lined, rapidly rotating the pipe about its longitudinal axis until the exposed surface of the lining is smooth and comparatively free from the reinforcing material, and then cooling the pipe and continuing the rotation until the lining has set.

5. A process of lining metal pipes, which consists in introducing into the pipe an appropriate quantity of a mixture of a hydrocarbon material and a powdery reinforcing material, heating the pipe and rapidly rotating it about its longitudinal axis until the exposed surface of the lining is smooth and glossy and comparatively free from the reinforcing material, and then cooling the pipe and continuing the rotation until the lining has set.

6. A process of lining metal pipes, which consists in making a fluid mixture of a hydrocarbon material with a powdery reinforcing material and a small percentage of sulphur, feeding this mixture into the pipe to be lined, rapidly rotating the pipe about its longitudinal axis to distribute the mixture to a uniform thickness over its interior surface and continuing the rotation with reduction of temperature until the lining is sufficiently set.

7. A process of lining metal pipes, which consists in feeding into the pipe to be lined a mixture of a siliceous material ground to a fine condition and a hydrocarbon material composed of bitumen and anthracene oil, rapidly rotating the pipe about its longitudinal axis at a temperature at which the hydrocarbon material is fluid, and continuing the rotation with reduction of temperature.

8. A process of lining metal pipes, which consists in introducing a fluid mixture of a hydrocarbon material and a powdery reinforcing material into the pipe to be lined and then rotating the pipe about its longitudinal axis to form the lining by centrifugal action, the material being introduced in a plurality of stages, that used in the earlier stages having a larger proportion of powdery reinforcing material, while that introduced to the last stage to form the exposed surface is composed largely of hydrocarbon material.

In testimony whereof I have signed my name to this specification.

BENJAMIN TALBOT.